(12) United States Patent
Toennesmann et al.

(10) Patent No.: US 10,302,217 B2
(45) Date of Patent: May 28, 2019

(54) VALVE UNIT AND A POSITIONING DEVICE FOR CONVERTING A ROTARY MOTION INTO A LINEAR MOTION

(71) Applicant: PIERBURG GMBH, Neuss (DE)

(72) Inventors: Andres Toennesmann, Aachen (DE); Martin Nowak, Leverkusen (DE); Andreas Koester, Essen (DE)

(73) Assignee: PIERBURG GMBH, Neuss (DE)

( * ) Notice: Subject to any disclaimer, the term of this patent is extended or adjusted under 35 U.S.C. 154(b) by 483 days.

(21) Appl. No.: 14/612,303

(22) Filed: Feb. 3, 2015

(65) Prior Publication Data
US 2015/0143933 A1 May 28, 2015

Related U.S. Application Data

(63) Continuation of application No. 13/510,012, filed as application No. PCT/EP2010/066613 on Nov. 2, 2010, now abandoned.

(30) Foreign Application Priority Data

Nov. 19, 2009 (DE) .................. 10 2009 053 428

(51) Int. Cl.
*F16K 31/528* (2006.01)
*F02B 37/18* (2006.01)
(Continued)

(52) U.S. Cl.
CPC .......... *F16K 31/528* (2013.01); *F02B 37/186* (2013.01); *F02M 26/54* (2016.02);
(Continued)

(58) Field of Classification Search
CPC ....... F16H 21/36; F02B 37/186; F02M 26/67; F02M 26/54
(Continued)

(56) References Cited

U.S. PATENT DOCUMENTS 1,349,661 A * 8/1920 Buhl ................. F16H 21/36
74/50
1,505,856 A * 8/1924 Briggs ................. F01B 9/023
123/197.4
(Continued)

FOREIGN PATENT DOCUMENTS

DE 2726341 A1 * 12/1978 .......... F16K 11/0704
EP 1632674 A2 * 3/2006 ........... F16K 31/528

*Primary Examiner* — Angelisa L Hicks
(74) *Attorney, Agent, or Firm* — Norman B. Thot

(57) ABSTRACT

A valve unit includes a positioning device for converting a rotary motion into a linear motion, a valve rod, a drive unit, a drive shaft with an eccentric arranged thereon, a coupling element comprising a slot, and an output shaft arranged at the eccentric which moves in the slot of the coupling element. The valve rod is connected with the coupling element. The valve rod is linearly movable with the coupling element between an initial position where the valve is closed and an end position. The slot comprises a guide path which cooperates with the eccentric having an angle with a plane perpendicular to a direction of movement of the adjusting element. The initial position of the eccentric is a position which is located before a dead center existing for an axial movement of the output shaft. The dead center is passed during a rotational movement of the drive shaft.

11 Claims, 3 Drawing Sheets

(51) Int. Cl.
  *F02M 26/54*  (2016.01)
  *F02M 26/67*  (2016.01)
  *F02B 39/00*  (2006.01)

(52) U.S. Cl.
  CPC ............. *F02M 26/67* (2016.02); *F02B 39/00* (2013.01); *Y02T 10/144* (2013.01); *Y10T 74/18208* (2015.01); *Y10T 74/18296* (2015.01)

(58) Field of Classification Search
  USPC .................................................... 251/129.11
  See application file for complete search history.

(56) References Cited

U.S. PATENT DOCUMENTS

| | | | | |
|---|---|---|---|---|
| 3,451,276 | A * | 6/1969 | Wadlow | F16H 21/36 |
| | | | | 74/50 |
| 7,461,642 | B2 * | 12/2008 | Bircann | 123/188.8 |
| 2004/0069285 | A1 * | 4/2004 | Telep | F02M 26/69 |
| | | | | 123/568.23 |

* cited by examiner

VALVE UNIT AND A POSITIONING DEVICE FOR CONVERTING A ROTARY MOTION INTO A LINEAR MOTION

CROSS REFERENCE TO PRIOR APPLICATIONS

This application is a continuation of application Ser. No. 13/510,012, filed on May 16, 2012, which is a U.S. National Phase application under 35 U.S.C. § 371 of International Application No. PCT/EP2010/066613, filed on Nov. 2, 2010 and which claims benefit to German Patent Application No. 10 2009 053 428.8, filed on Nov. 19, 2009. The International Application was published in German on May 26, 2011 as WO 2011/061051 A1 under PCT Article 21(2).

FIELD

The present invention provides a positioning device for converting a rotary motion into a linear motion comprising a drive unit generating a torque, a drive shaft on which an eccentric is arranged, an output shaft arranged at the eccentric and movable in a slot of a coupling member, and an adjusting element connected with the coupling element and supported so that the adjusting element is adapted to be moved linearly together with the coupling element.

BACKGROUND

Such positioning devices are used in particular to drive exhaust gas recirculation valves, but they may also be used in waste gate valves, butterfly valves or as VNT actuators.

Various valves with positioning devices or similar positioning devices are known, wherein an electric motor serves as the drive unit whose drive shaft is coupled with eccentrics of various types, the motion of the eccentrics being converted, via different coupling mechanisms, into a linear motion of a valve rod serving as an adjusting element.

EP 1 319 879 A1 describes a valve driven by an electric motor, wherein an output shaft is arranged eccentrically with respect to a drive shaft, a roller being provided rotatably on the output shaft and traveling in a slot of a coupling element. The roller is spring-biased in one direction. The traveling path of the coupling element slot provided for the roller is perpendicular to the direction of movement of the coupling element. The development of the force-stroke curve of this element is thus fixed.

DE 102 21 711 A1 describes a similar valve wherein two eccentrics are coupled with each other. In this design, the slot that serves as a traveling path for a ball bearing is also designed as a straight line that extends perpendicularly to the direction of movement. It is again not possible to provide special required force-stroke curves during the actuation of the valve with sufficient variability.

A valve driven by an electric motor is also described in EP 1 378 655 A2, wherein a rotating member comprises two opposite slots in which a rod is guided which in turn is connected with a valve rod. The slot may here be configured as a defined curve. With this design, it is possible to set a defined effort for the adjustment of the valve as a direct function of the stroke. The required structural space is rather large, as is the number of components needed.

SUMMARY

An aspect of the present invention is to provide a positioning device which allows the selection of a force-stroke curve or a rotational angle-stroke curve for specific applications and which at the same time requires as little space as possible.

In an embodiment, the present invention provides a valve unit which includes a positioning device for converting a rotary motion into a linear motion, a valve rod, a drive unit configured to generate a torque, a drive shaft on which an eccentric is arranged, a coupling element comprising a slot, and an output shaft arranged at the eccentric. The output shaft is configured to move in the slot of the coupling element. The valve rod is connected with the coupling element. The valve rod is supported so as to be linearly movable with the coupling element between an initial position in which the valve is in a closed position and an end position. The slot comprises a guide path configured to cooperate with the eccentric which comprises an angle with a plane perpendicular to a direction of movement of the adjusting element. The initial position of the eccentric is a position which is located, as seen in a direction of rotation, before a dead center existing for an axial movement of the output shaft, the dead center being passed during a rotational movement of the drive shaft. Due to the previously unknown interaction of an eccentric drive and a slot curve path, it is possible for the first time, and to a much larger extent than before, to set force-stroke curves rotational angle-stroke curves that allow for an adjustment of such a positioning device to a number of different applications. The structural space is thereby not larger than with other known eccentric drives. With the same total stroke, the length of the eccentric may be chosen to be even smaller.

BRIEF DESCRIPTION OF THE DRAWINGS

The present invention is described in greater detail below on the basis of embodiments and of the drawings in which.

DETAILED DESCRIPTION

Figure 1:
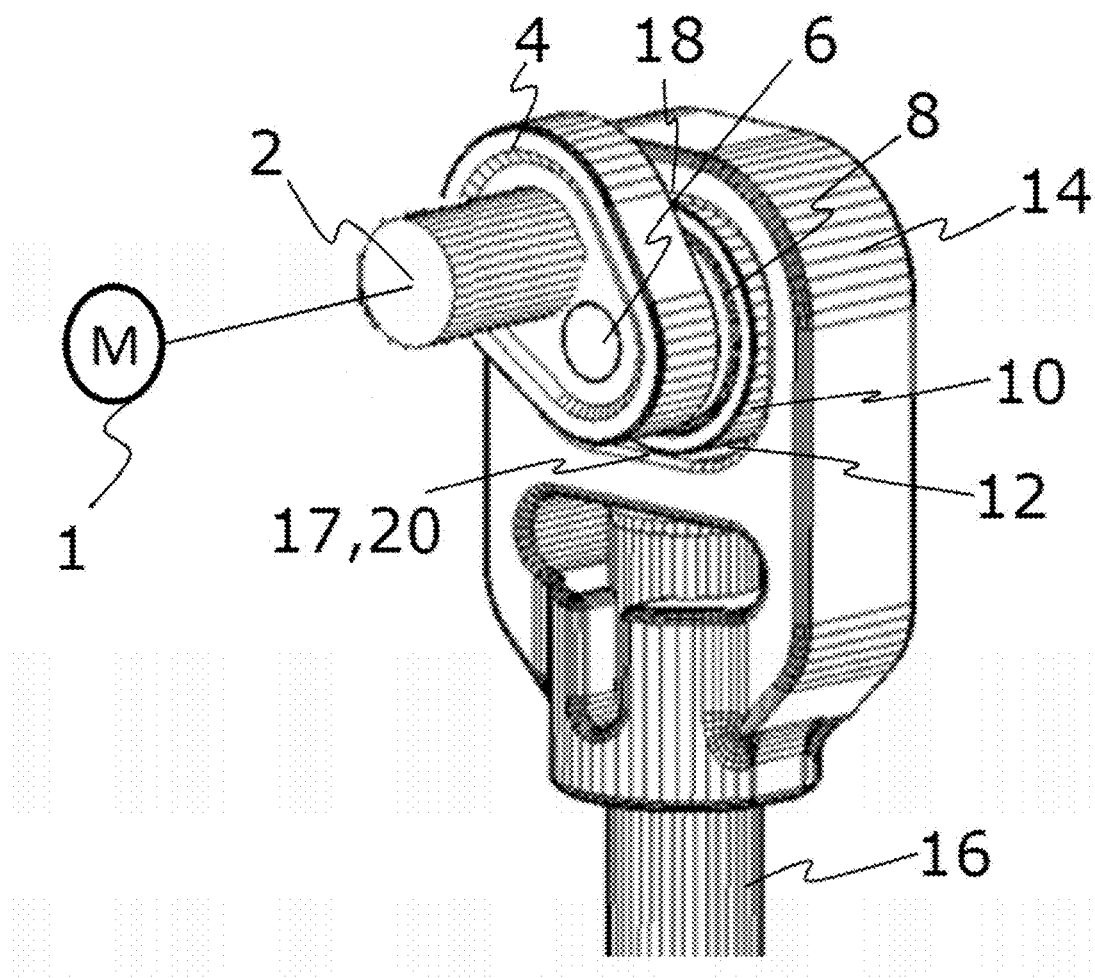
FIG. 1 shows a perspective view of the coupling device and the eccentric of a positioning device according to prior art.

In an embodiment of the present invention, the slot can, for example, describe a curve with a varying pitch. This provides additional possibilities for the adjustment of force-stroke curves to specific applications.

In an embodiment of the present invention, a roller or a bearing can, for example, be arranged on the output shaft, which travels in the slot so that friction between the slot or its traveling path and the outer path of the rolling body, i.e. the bearing or the roller in the present instance, is minimized.

In an embodiment of the present invention, the initial position of the rotation for the actuation of the adjusting element can, for example, be a position which, seen in the direction of rotation, is situated before a dead center existing for the axial movement of the output shaft, which dead center is passed during the rotational movement to the end position. It thus becomes possible to realize short strokes of a valve with rather large actuating angles, which allows for an exact proportioning in the sensitive adjustment range shortly after leaving the closed position.

In an embodiment of the present invention, a first portion of the slot to be traveled by the output shaft can, for example, have an upward slope with respect to the plane perpendicular to the direction of movement of the adjusting element, while a second portion to be traveled can, for example, have a downward slope. With such a design, a further adaptation of the relationship between the angle of rotation and the resulting stroke can be obtained as well as an adaptation to a desired force-stroke characteristic which may lead, for example, to a largely constant effort for the adjustment in the first portion. At the same time, such an adaptation allows for an additional reduction outside an upstream transmission.

In an embodiment of the present invention, the upward slope in the first portion to be traveled can, for example, be steeper than the upward slope of a rolling line of the output shaft when traveling through the portion from a first end position to the top dead center, seen with respect to the axial movement of the output shaft. It is thereby provided that a stroke occurs in this adjustment region.

The lifting force can thus be kept constant in a significant region about at least one of the two end stops. The available adjustment force thereby becomes independent of tolerances that could occur, for example, as a result of a thermal expansion of the valve rod. Such an almost constant force curve in the region of the closed position for about 15-25% of the full stroke is required in particular in case of the application of the positioning device as an actuator of a waste gate valve, because of the prevailing gas pressure forces at the gate.

A positioning device is thus provided whose coupling device, in combination with the eccentric, leads to the possibility of a selectable force-stroke setting by appropriately adjusting the selected rotational angle range with respect to the slot. The present positioning device also allows an adjustment between the angle of rotation and the stroke for a better proportioning. The required structural space is at the same time kept very small.

An embodiment of the positioning device of the present invention is illustrated in the drawings and will hereinafter be described.

FIG. 1 illustrates a detail of a positioning device corresponding to the prior art. The part here illustrated is the part of the positioning device essential to the present invention.

As is known per se, the positioning device comprises a rotary drive unit 1 such as, for example, an electric motor (M), which drives a drive shaft 2. On the end of the drive shaft 2 opposite the drive unit 1, an eccentric 4 is provided in a manner secured against rotation. At the end of the eccentric 4 remote from the drive shaft 2, an output shaft 6 is provided that extends parallel to the drive shaft 2 so that the output shaft 6 rotates in a circular manner about the drive shaft 2 when the drive shaft 2 is rotated.

A ball bearing 8 is arranged at the end of the output shaft 6 opposite the eccentric 4, the inner race thereof being fastened on the output shaft 6. An outer race 10 of the ball bearing 8 moves in a slot 12 of a coupling element 14 to which an adjusting element 16 in the form of a valve rod of a globe valve not illustrated in detail herein is attached. The valve rod is supported in a housing in a manner known per se so that it can only perform a linear stroke movement with the coupling element. In the coupling device 14 illustrated, the slot 12 is an opening limited in height by two limiting walls 17, 18 whose mutual distance substantially corresponds to the circumference of the ball bearing 8 and whose width is determined by the length of the eccentric 4 and by the adjustment angle thereof. The limiting walls 17, 18 that serve as the guide path 20 of the ball bearing 8 are designed as straight planes that extend perpendicularly to the direction of movement of the valve rod 16 when the drive unit 1 is operated.

Figure 2A:
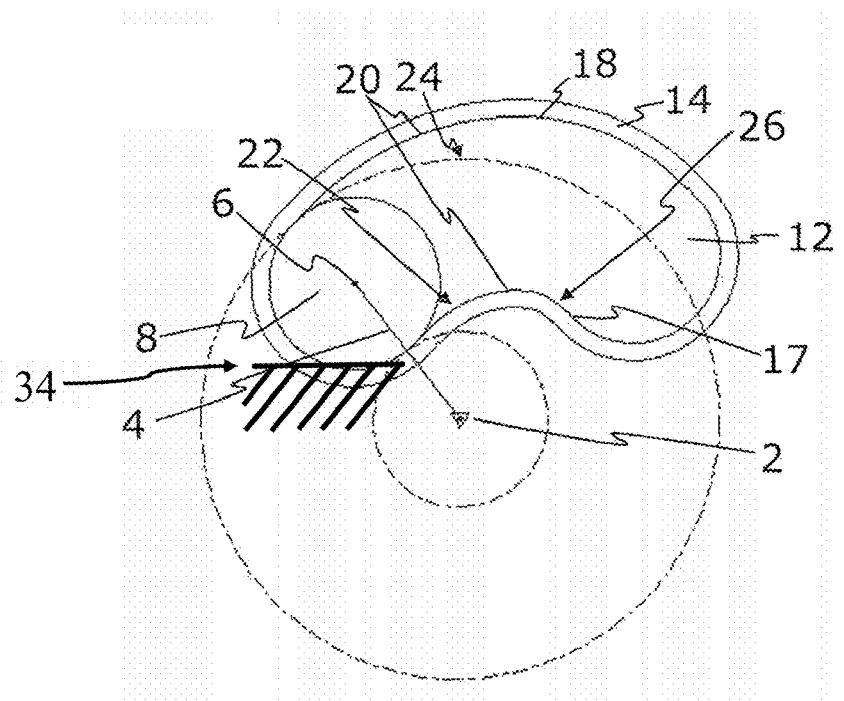
FIGS. 2a) and b) shows the coupling device and the eccentric of a positioning device of the present invention at the respective end positions.
Figure 2B:
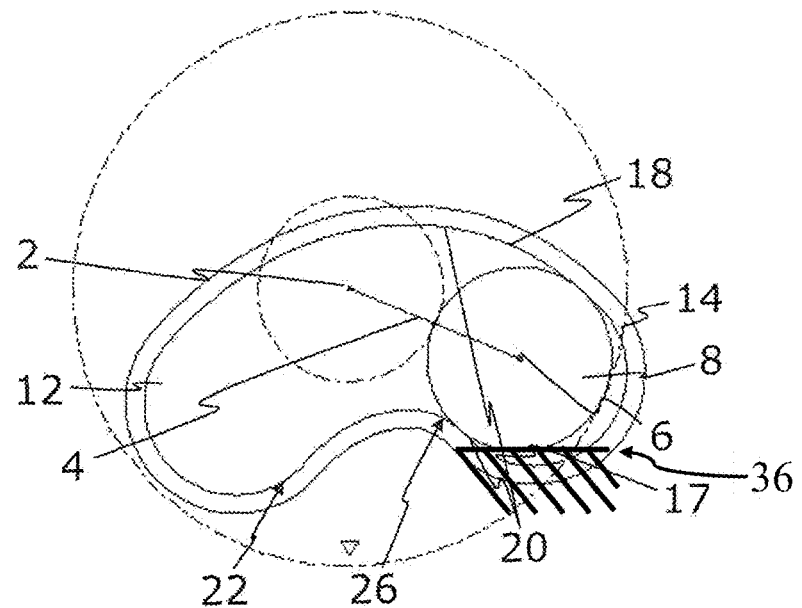

In comparison with the above, the slot 12 according to the present invention, or the resulting guide track 20, illustrated in FIG. 2 is designed as a curve. A curve in the sense of the present application is thus a line that is not necessarily completely linear.

This curve is designed so that a positioning device of this type is suitable, for example, to drive a waste gate valve. With such a valve, it is desired that, when leaving the closed position of the valve, the valve force remains approximately constant over a certain opening range.

In FIG. 2, the eccentric 4 is only indicated as a connecting line between the fulcrum of the eccentric 4 and the pivot point 6 of the bearing 8 or a roller. FIG. 2 a) illustrates the coupling element 14 in a position in which the adjusting element 16 is in a first end position 34 that is defined, for example, by correspondingly formed stops 34 for upstream gears or other movable parts. In this position, the bearing 8 is located at the left end of the slot 12 below a dead center 24 of the eccentric 4 that is the top dead center with respect to the axial movement of the pivot point 6.

If, hereafter, the drive unit 1 is operated clockwise and the eccentric is thereby rotated clockwise, the bearing 8 is rotated at a constant distance around the rotational axis of the drive shaft 2 and rolls along the guide path 20 of the slot 12 that is only movable in the vertical direction. A first part of the slot 12 traveled by the rolling of the bearing 8 has a slope 22 with respect to a plane vertical to the actuation direction of the adjusting element, which slope is steeper than the respective circular arc traveled by the bearing. Despite the upward movement of the bearing, this causes a downward movement of the slot 12 and thus of the coupling element 14 and the adjusting element 16. The part of the guide path 20 following after the top dead center 24 has been passed first has a lesser upward slope 22 that eventually passes into a downward slope in a second part 26. FIG. 2 b) illustrates the second end position/stop 36 reached after both parts 22, 26 have been passed.

Figure 3:
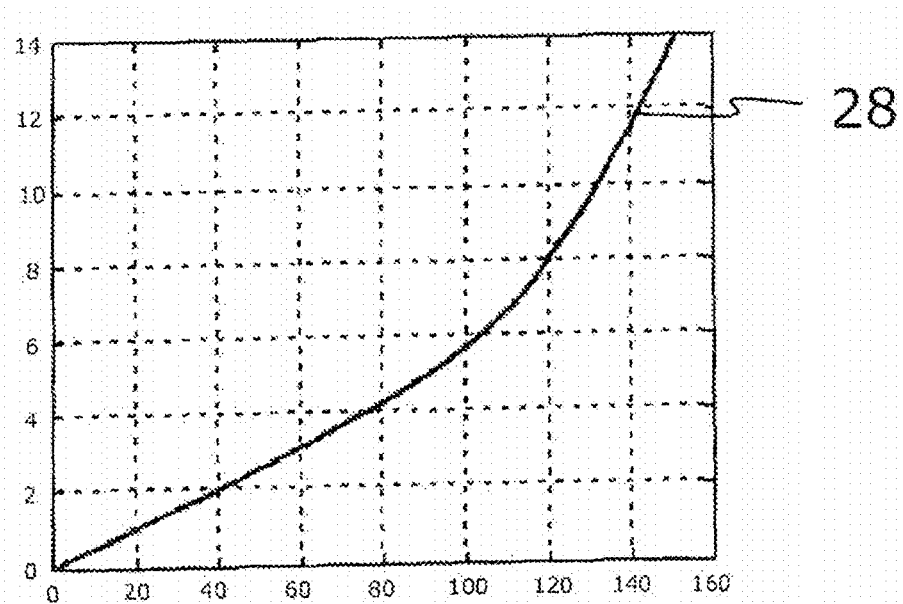
FIG. 3 shows the function of linear stroke over an angle of rotation for a positioning device with a coupling device of FIG. 2 in graphic representation.

The stroke resulting from this movement is plotted in FIG. 3 over the rotational angle. It is evident that the resulting graph 28 is rather flat in the first part and is significantly steeper as the stroke becomes larger. Such a curve is advantageous, since it is drastically facilitates volume flow control, because in the part just after opening a small change in the stroke results in a rather significant change in the volume flow, whereas, with a rather large stroke, a change in stroke only results in rather small changes in the volume flow.

Figure 4:
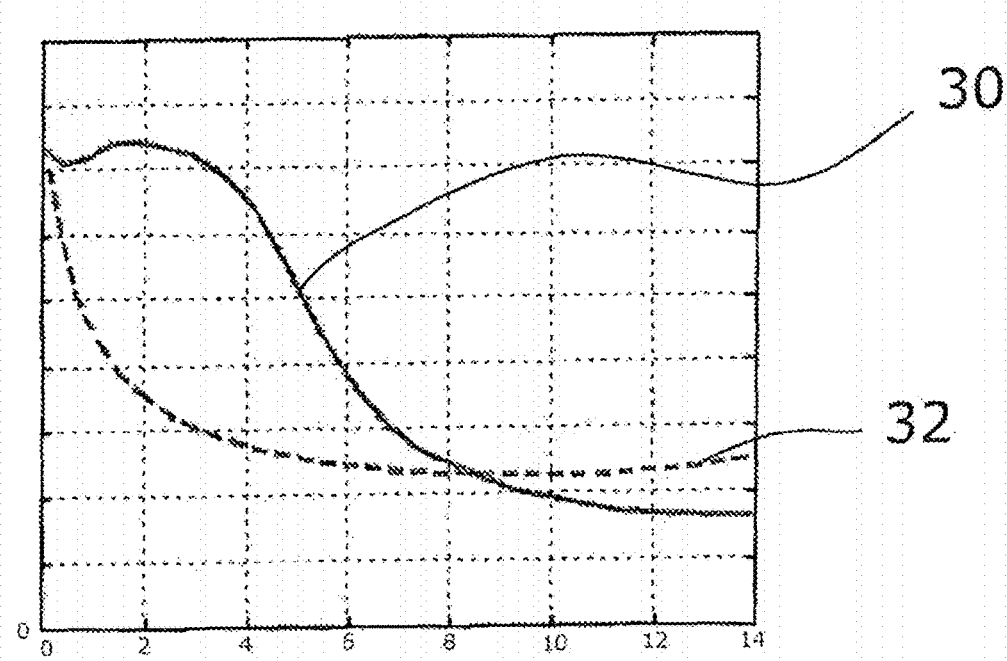
FIG. 4 shows the function of force over stroke for a positioning device with a coupling device of FIG. 2 in a graphic representation, compared with the corresponding function of a plane slot.

In FIG. 4 the graph 30 illustrates the force-stroke curve of a positioning device according to FIG. 2, whereas the dotted graph 32 represents the force-stroke curve of a positioning device with a guide path perpendicular to the movement direction of the adjusting element as illustrated in FIG. 1. In a range of up to about 4 mm of stroke, corresponding to about 25% of the total stroke, the valve force to be applied by a positioning device of FIG. 2, contrary to the valve force to be applied by a positioning device of FIG. 1, only changes slightly with the stroke.

Besides this advantage of setting a desired force curve, it is also possible to realize additional reductions and transmissions with respect to the entire adjustment range by using the slot to increase or reduce the adjusting path of the adjusting element relative to the length of stroke of the output shaft.

Additional structural space can be saved in this manner. The positioning device of the present invention allows adjusting both force-stroke curves and rotational angle-stroke curves depending on the respective application, so that such a positioning device can be used in many different applications, basically without resulting in a larger required structural space as compared with known positioning devices.

The scope of protection of the claims is not restricted to the embodiment described, different forms of the guide path may be desired depending on the application, in order to achieve the advantageous force-stroke curve. It is also possible to design such a positioning device to act in the opposite direction.

What is claimed is:

1. A valve unit comprising:
   a positioning device for converting a rotary motion into a linear motion comprising,
      a valve rod,
      a drive unit configured to generate a torque,
      a drive shaft on which an eccentric is arranged,
      a coupling element comprising a slot, the valve rod being connected with the coupling element, and
      an output shaft arranged at the eccentric, the output shaft being configured to move in the slot of the coupling element,
   wherein,
      the valve rod is supported so as to be linearly movable with the coupling element between an initial position in which the valve unit is in a closed position and an end position,
      the slot comprises a guide path configured to cooperate with the eccentric, the guide path of the slot comprising an angle with a plane perpendicular to a direction of movement of the valve rod,
      the initial position of the eccentric is a position which is located, as seen in a direction of rotation, before a dead center existing for an axial movement of the output shaft, the dead center being passed during a rotational movement of the drive shaft, and
      the slot is immovably attached to the valve rod.

2. The valve unit as recited in claim 1, wherein the guide path is a curve with a changing slope.

3. The valve unit as recited in claim 1, further comprising a roller or a bearing arranged on the output shaft, wherein the roller or bearing is configured to move in the slot.

4. The valve unit as recited in claim 1, further comprising a first part of the slot to be traveled by the output shaft and a second part of the slot to be traveled by the output shaft, wherein the first part of the slot to be traveled by the output shaft has an ascending slope with respect to a plane vertical with respect to a direction of movement of the valve rod, and the second part of the slot to be traveled by the output shaft has a descending slope with respect to the plane vertical with respect to the direction of movement of the valve rod.

5. The valve unit as recited in claim 4, further including a circular arc with a slope, wherein the ascending slope in the first part of the slot to be traveled by the output shaft is steeper than the slope of the circular arc when the output shaft travels from a first end portion to a top dead center of the axial movement.

6. A positioning device for converting a rotary motion into a linear motion, the positioning device comprising:
   a drive unit configured to generate a torque;
   a drive shaft on which an eccentric is arranged;
   a coupling element comprising a slot;
   an output shaft arranged at the eccentric, the output shaft being configured to move in the slot of the coupling element; and
   a valve rod connected with the coupling element, the valve rod being supported so as to be linearly movable with the coupling element between a first end position and a second end position, the first end position and the second end position each being defined by a stop,
   wherein, the slot comprises a guide path configured to cooperate with the eccentric, the guide path of the slot comprising an angle with a plane perpendicular to a direction of movement of the valve rod,
   the positioning device is configured to drive a valve, and
   the slot is immovably attached to the valve rod.

7. The positioning device as recited in claim 6, wherein the guide path is a curve with a changing slope.

8. The positioning device as recited in claim 6, further comprising a roller or a bearing arranged on the output shaft, wherein the roller or bearing is configured to move in the slot.

9. The positioning device as recited in claim 6, wherein an initial position of a rotation for an actuation of the valve rod is a position that is located, seen in a direction of rotation, before a dead center existing for an axial movement of the output shaft, the dead center being passed during a rotational movement to an end position.

10. The positioning device as recited in claim 9, further comprising a first part of the slot to be traveled by the output shaft and a second part of the slot to be traveled by the output shaft, wherein the first part of the slot to be traveled by the output shaft has an ascending slope with respect to a plane vertical with respect to a direction of movement of the valve rod, and the second part of the slot to be traveled by the output shaft has a descending slope with respect to the plane vertical with respect to the direction of movement of the valve rod.

11. The positioning device as recited in claim 10, further including a circular arc with a slope, wherein the ascending slope in the first part of the slot to be traveled by the output shaft is steeper than the slope of the circular arc when the output shaft travels from a first end portion to a top dead center of the axial movement.

* * * * *